Sept. 23, 1924.

J. FUENTE

BINDER CUTTER

Filed April 14, 1922    2 Sheets-Sheet 1

1,509,135

Julio Fuente
INVENTOR

Sept. 23, 1924.

J. FUENTE

BINDER CUTTER

Filed April 14, 1922  2 Sheets-Sheet 2

1,509,135

Julio Fuente
INVENTOR

BY Victor J. Evans
ATTORNEY

WITNESS:

Patented Sept. 23, 1924.

1,509,135

UNITED STATES PATENT OFFICE.

JULIO FUENTE, OF WEST TAMPA, FLORIDA.

BINDER CUTTER.

Application filed April 14, 1922. Serial No. 552,770.

*To all whom it may concern:*

Be it known that I, JULIO FUENTE, a citizen of the United States, residing at West Tampa, in the county of Hillsborough and State of Florida, have invented new and useful Improvements in Binder Cutters, of which the following is a specification.

This invention relates to cigar making implements and has particular application to what is known as a binder or wrapper cutter.

The chief characteristic of the present invention resides in providing an implement of the above mentioned character including a plurality of cutting blades, whereby a maximum amount of work may be accomplished in a given time, the blades being of cleaver-like formation, and designed to cut the binders or wrappers smoothly, in other words, to minimize the possibility of tearing or otherwise injuring the wrappers while cutting the same.

Another object of the invention resides in an implement of the class in question, wherein the cutting blades are susceptible of relative adjustment, so that the binders or wrappers can be cut in various lengths.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1:
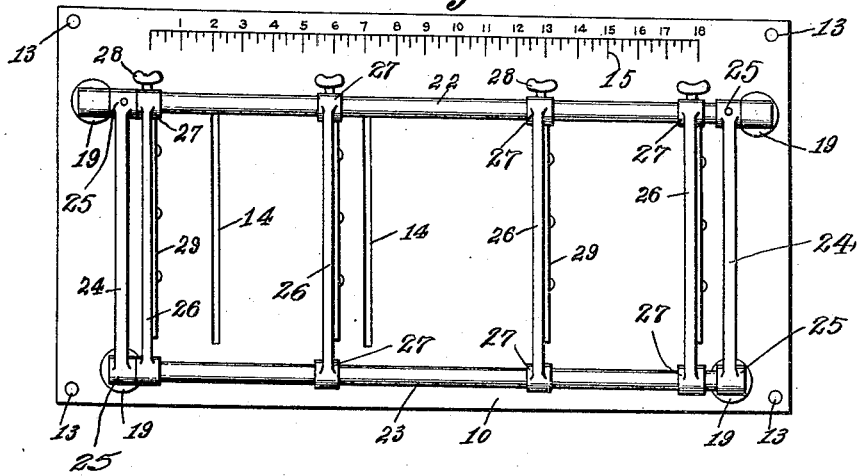
Figure 1 is a top plan view of the implement forming the subject matter of the invention.
Figure 2:
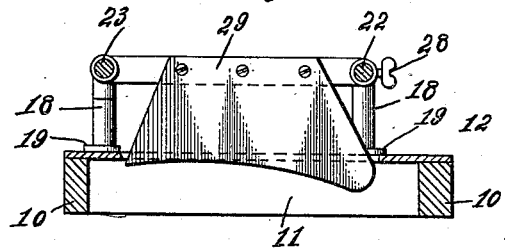
Figure 2 is a transverse sectional view.
Figure 3:
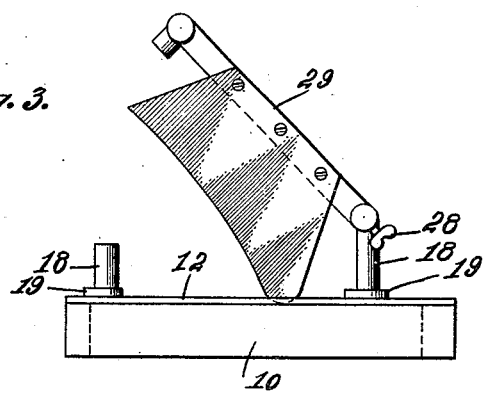
Figure 3 is an end elevation of the device having the cutting blades in elevated position.
Figure 4:
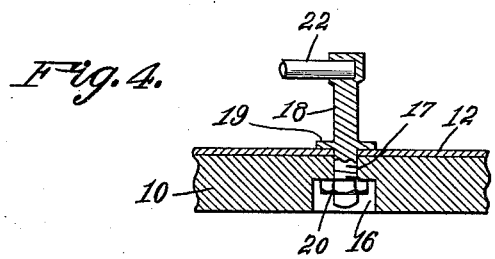
Figure 4 is a fragmentary view of the base, partly in section, showing the manner of associating the frame support with the base.
Figure 6:
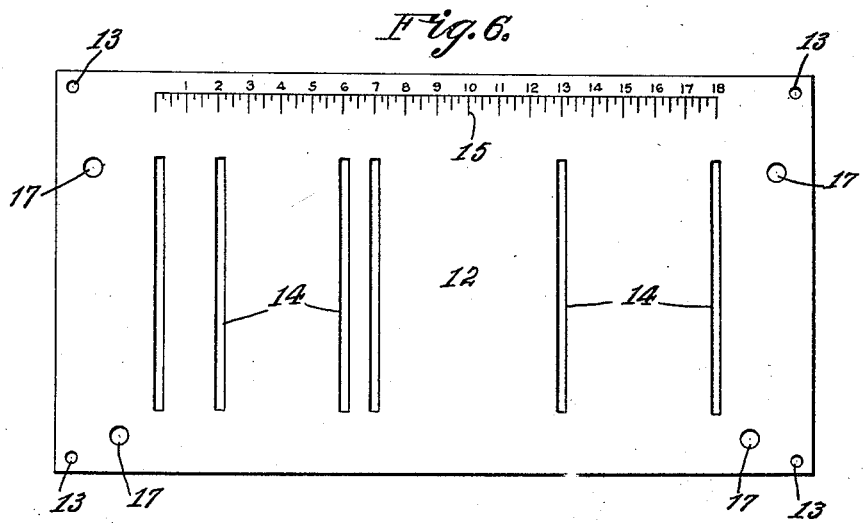
Figure 6 is a view of the metallic covering for said base.
Figure 5:
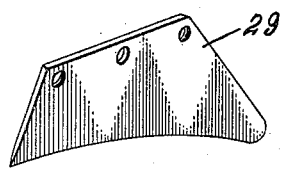
Figure 5 is a detail view of one of the cutting blades.

The implement above referred to comprises a base 10 which may be constructed from any suitable material and also vary in size without departing from the invention. The base 10 however, is preferably constructed of wood and slotted as at 11 for the purpose to be hereinafter described. Secured upon the upper surface of the base 10 is a metallic sheet or covering 12 which may be secured to the base in any suitable manner, such as for instance, by the fastening elements 13. This metallic sheet is also slotted as at 14, and these slots coincide with the slots of the base 10 as illustrated. Along one edge of this metallic sheet, I have provided suitable graduations 15. The base 10 adjacent the corners thereof is recessed from the underside as at 16, and communicating with each recess is a restricted opening 17 through which a standard 18 is passed. Each standard has associated therewith a collar 19 which reposes upon the upper surface of the base, and that portion of the standard positioned within the recess 16 is equipped with a suitable nut 20. As shown, the standards are arranged in pairs adjacent the opposed longitudinal edges of the base 10, and constituting supporting means for the cutting frame to be presently described.

Carried by one pair of the standards 18 are horizontally disposed bearings 21 in which the adjacent ends of a shaft 22 are journaled. The cutting frame includes the shaft 22 and a spaced parallel shaft 23, these shafts being connected together by arms 24, thus defining a frame substantially of rectangular formation in plan. These arms 24 are provided at their ends with bearings 25 to accommodate themselves to the respective shafts 22 and 23. As above stated, the shaft 22 is journaled in the bearings 21, and supported by one pair of standards 18, so that the cutting frame may be elevated or lowered incident to the use of the implement, while the other pair of standards are utilized to support the free end of the cutting frame, which is adapted to repose upon the latter mentioned standards as clearly shown. Carried by the frame just described, and arranged between the stationary arms 24 is a plurality of relatively movable arms 26, each of these arms having bearings 27 at the ends thereof which are slidably fitted on the shafts 22 and 23 respectively. One bearing of each arm is provided with a set screw 28, which when tightened is forced into contact with the shaft 22 and serves to hold the arms fixed with relation thereto. Each of said arms support a cutting blade 29, and as shown each blade is of cleaverlike formation so as to cut the binders or wrappers smoothly, or in other words, to prevent tearing or otherwise injuring the wrappers in any manner whatsoever. The arms 26 with the respective blades are susceptible of relative adjustment so that they can be spaced the proper distance for cutting binders or wrappers of various lengths as the occasion may require. When the cutting frame is lowered to its active position, the cutting blades pass through the slots 14 of the metallic sheet 12 and also through the slots 11 of the base 10, and in this manner, the cutting edge of each blade is prevented from being brought into contact with the base, which obviously would tend to dull if not destroy the blade to the extent of making it impossible to cut the binder or wrapper without tearing the same. The implement in its entirety is very simple in construction, being made up of comparatively few parts and is very efficient for the purpose intended.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A binder cutter comprising a base, having spaced parallel slots, standards rising from the base, a cutting frame including spaced parallel shafts, arms connecting said shafts, one of said shafts being journaled in said standards, a cutting blade carried by each arm and movable in said slots, said arms being slidable on said shafts whereby the blades can be spaced different distances apart, and means for limiting the downward movement of the frame.

2. A binder cutter comprising a base having spaced parallel slots, a cutting frame pivoted upon the base and movable toward and away from the latter, said frame including spaced parallel shafts, stationary arms connecting said shafts, other arms connecting said shafts and slidable on the latter, whereby the latter mentioned arms can be spaced different distances apart, means for holding said movable arms fixed relatively to the shafts, a cutting blade carried by each of said movable arms, and means for limiting the downward movement of said frame.

In testimony whereof I affix my signature.

JULIO FUENTE.